United States Patent
Fei et al.

(10) Patent No.: US 9,195,565 B1
(45) Date of Patent: *Nov. 24, 2015

(54) PROGRAMMER SPECIFIED CONDITIONS FOR RAISING EXCEPTIONS AND HANDLING ERRORS DETECTED WITHIN PROGRAMMING CODE

(71) Applicant: Google Inc., Mountain View, CA (US)

(72) Inventors: Long Fei, Campbell, CA (US); Manisha Jain, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/340,926

(22) Filed: Jul. 25, 2014

Related U.S. Application Data

(63) Continuation of application No. 13/494,627, filed on Jun. 12, 2012, now Pat. No. 8,793,661.

(60) Provisional application No. 61/639,655, filed on Apr. 27, 2012.

(51) Int. Cl.
 G06F 9/44 (2006.01)
 G06F 11/36 (2006.01)

(52) U.S. Cl.
 CPC .................................. G06F 11/3612 (2013.01)

(58) Field of Classification Search
 USPC .................................. 717/123–129, 140–141
 IPC ............ G06F 11/362,11/3664, 11/3668, 11/30,
  G06F 11/36, 11/3604, 11/3608, 11/3612
 See application file for complete search history.

(56) References Cited

U.S. PATENT DOCUMENTS

| | | | |
|---|---|---|---|
| 5,732,277 A * | 3/1998 | Kodosky et al. | 717/125 |
| 5,774,729 A * | 6/1998 | Carney et al. | 717/126 |
| 5,907,709 A * | 5/1999 | Cantey et al. | 717/141 |
| 5,953,530 A * | 9/1999 | Rishi et al. | 717/127 |
| 6,158,045 A | 12/2000 | You | |
| 6,412,109 B1 | 6/2002 | Ghosh | |
| 6,651,243 B1 | 11/2003 | Berry | |
| 6,895,578 B1 | 5/2005 | Kolawa | |
| 7,020,766 B1 * | 3/2006 | Wang et al. | 712/227 |

(Continued)

OTHER PUBLICATIONS

Lucia et al, "Conflict Exceptions: Simplifying Concurrent Language Semantics with Precise Hardware Exceptions for Data-Races", ACM, pp. 210-221, 2010.*
Fiala et al, "Detection and Correction of Silent Data Corruption for Large-Scale High-Performance Computing", IEEE, pp. 1-12, 2012.*
Kondoh et al, "Finding Bugs in Java Native Interface Programs", ACM, pp. 109-117, 2008.*

(Continued)

*Primary Examiner* — Anil Khatri
(74) *Attorney, Agent, or Firm* — Fish & Richardson P.C.

(57) ABSTRACT

A system is configured to obtain code that includes a set of protected instructions, the set of protected instructions, when executed, performing acts associated with the code; execute a region of the code, the region including a protected instruction, the protected instruction identifying a first condition that, when satisfied by a condition under which a particular error is detected, causes an exception, associated with the particular error, to be raised, the first condition being specified by a programmer associated with the computing device; detect an error within a line of the code associated with the protected instruction; identify a second condition under which the error is detected; determine whether the second condition satisfies the first condition; raise an exception, associated with the error, when the second condition satisfies the first condition; and process the error based on raising the exception associated with the error.

20 Claims, 8 Drawing Sheets

(56) References Cited

U.S. PATENT DOCUMENTS

| | | | | |
|---|---|---|---|---|
| 7,058,928 | B2 | 6/2006 | Wygodny | |
| 7,069,543 | B2* | 6/2006 | Boucher | 717/127 |
| 7,114,149 | B2* | 9/2006 | Aptus et al. | 717/123 |
| 7,200,839 | B2 | 4/2007 | Kadlecik | |
| 7,216,341 | B2* | 5/2007 | Guarraci | 717/127 |
| 7,266,808 | B2* | 9/2007 | Kolawa et al. | 717/126 |
| 7,287,243 | B2 | 10/2007 | Dollin | |
| 7,320,123 | B2* | 1/2008 | Govindarajapuram et al. | 717/124 |
| 7,392,507 | B2* | 6/2008 | Kolawa et al. | 717/124 |
| 7,480,919 | B2 | 1/2009 | Bray | |
| 7,607,125 | B2* | 10/2009 | Shinnar et al. | 717/140 |
| 7,685,570 | B2* | 3/2010 | Draine et al. | 717/125 |
| 7,703,075 | B2* | 4/2010 | Das et al. | 717/123 |
| 7,721,263 | B2* | 5/2010 | Swoboda | 717/124 |
| 7,797,685 | B2* | 9/2010 | Agarwala et al. | 717/128 |
| 7,797,686 | B2 | 9/2010 | Agarwala | |
| 7,810,073 | B2* | 10/2010 | Ehrman et al. | 717/126 |
| 7,987,390 | B2 | 7/2011 | Chandrasekaran | |
| 8,037,453 | B1* | 10/2011 | Zawadzki | 717/123 |
| 8,079,019 | B2 | 12/2011 | Lindo | |
| 8,127,277 | B2* | 2/2012 | Albot et al. | 717/127 |
| 8,171,457 | B2* | 5/2012 | Dimpsey et al. | 717/125 |
| 8,291,381 | B2 | 10/2012 | Lai | |
| 8,407,673 | B2 | 3/2013 | Terpolilli | |
| 8,434,067 | B2 | 4/2013 | Nagabhushan | |
| 8,468,500 | B2 | 6/2013 | Hatabu | |
| 8,473,919 | B2* | 6/2013 | Cutler | 717/128 |
| 8,589,889 | B2* | 11/2013 | Kim et al. | 717/127 |
| 8,650,547 | B2 | 2/2014 | Randimbivololona | |
| 8,782,609 | B2* | 7/2014 | Robinson | 717/127 |

OTHER PUBLICATIONS

Bovenzi et al, "Error Detection Framework for Complex Software Systems", ACM, pp. 61-66, 2011.*

Alessandro F. Garcia, Cecilia M.F. Rubira, Alexander Romanovsky, and Jie Xu, 'A Comparative Study of Exception Handling Mechanisms for Building Dependable Object-Oriented Software', Journal of Systems and Software, 2001, 50 pages.

Bruno Cabral and Paulo Marques, 'Exception Handling: A Field Study in Java and .Net', European Conference on Object Oriented Programming, 2007, 25 pages.

Christophe de Dinechin, 'C++ Exception Handling', IEEE Concurrency, Oct.-Dec. 2000,8 pages.

Fiala et al, 'Detection and Correction of Silent Data Corruption for Large-Scale High-Performance Computing', IEEE, pp. 1-12, 2012.

Filho et al, 'Verification of Coordinated Exception Handling', ACM, pp. 680-685,2006.

Jonathan L. Schilling, 'Optimizing Away C++ Exception Handling', ACM SIGPLAN Notices, 1998,8 pages.

Lucia et al, 'Conflict Exceptions: Simplifying Concurrent Language Semantics with Precise Hardware Exceptions for Data-Races', ACM, pp. 210-221, 2010.

Manish Gupta, Jong-DeokChoi, and Michael Hind, 'Optimizing Java Programs in the Presence of Exceptions', European Conference on Object-Oriented Programming, 2000, 26 pages.

Martin P. Robillard and Gail C. Murphy, 'Designing Robust Java Programs with Exceptions', ACM SIGSOFT Symposium on the Foundations of Software Engineering, 2000, 9 pages.

Simpson et al, 'Segment Protection for Embedded Systems Using Runtime Checks', ACM, pp. 66-77, 2005.

* cited by examiner

700 ⟶

```
functionA(i: int): int {                                              705-1
  j: int = create exception (error_code, error_info, raise_on_use, raise_on_escape);
  k: int = 0;          # executed, exception not raised
  k = i + j;           # exception raised, transfer to handler
  return 10;           # not executed due to exception raise
};
                                                                      710-1
```

```
functionB(i: int): int {    705-2
  t: int = functionA(i)   # exception propagated, but not raised
  y: int = 3;             # executed as if no exception
  z = f(t);               # exception raise, transfer to default handler
  return t;               # not executed due to exception raise
};                                                                    710-2
```

```
functionC(): int {    705-3
  x: int = functionB(0); # exception propagated, but not raised
  return x;              # raise exception on escape, transfer to handler
} error handler instruction (error_code: int, error_info) {
  if (err_code = code1)
    result 0;
  result 1;                              715
};
x = functionC()         # x gets 0 or 1                               710-3
```

Fig. 7

PROGRAMMER SPECIFIED CONDITIONS FOR RAISING EXCEPTIONS AND HANDLING ERRORS DETECTED WITHIN PROGRAMMING CODE

REFERENCE TO RELATED APPLICATION

This application is a continuation application of, and claims priority to, U.S. patent application Ser. No. 13/494,627, now U.S. Pat. No. 8,793,661, entitled "Programmer Specified Conditions For Raising Exceptions And Handling Errors Detected Within Programming Code," filed on Jun. 12, 2012, which claims priority to U.S. Provisional Patent Application No. 61/639,655, filed Apr. 27, 2012. The disclosures of the foregoing applications are incorporated herein by reference in their entirety for all purposes.

BACKGROUND

Computing devices may allow programmers to develop programming code, compile programming code, and/or execute programming code. The computing devices may raise exceptions when errors are detected, within the programming code, when the programming code is being executed. Raising the exceptions may allow the errors to be processed and/or handled by error handlers associated with the code. In large-scale distributed systems that include multiple computing devices executing all or portions of the code, the computing devices may raise exceptions in a manner that renders the large scale distributed system unable to execute the code and/or causes operation of the large scale distributed system to be disrupted.

SUMMARY

According to one possible implementation, a method may include obtaining, by a computing device, programming code, the code may include a set of protected instructions, the set of protected instructions, when executed by the computing device, may perform acts associated with the code. The method may also include executing, by the computing device, a region of the code that includes a protected instruction of the set of protected instructions, the protected instruction may identify a first condition that, when satisfied by a condition under which a particular error is detected, causes an exception, associated with the particular error, to be raised. The first condition may be specified by a programmer associated with the computing device. The method may further include detecting, by the computing device, an error within a line of the code associated with the protected instruction; identifying, by the computing device, a second condition under which the error is detected; determining, by the computing device, whether the second condition satisfies the first condition; raising, by the computing device, an exception, associated with the error, when the second condition satisfies the first condition; and processing, by the computing device, the error based on raising the exception associated with the error.

BRIEF DESCRIPTION OF THE DRAWINGS

The accompanying drawings, which are incorporated in and constitute a part of this specification, illustrate one or more implementations described herein and, together with the description, explain these implementations. In the drawings.

FIG. 7 is a diagram of example programming code that includes one or more protected instructions and/or error handling instructions.

DETAILED DESCRIPTION

The following detailed description refers to the accompanying drawings. The same reference numbers in different drawings may identify the same or similar elements.

A system and/or method, described herein, may allow a distributed computing system (hereinafter referred to as a "DCS") to execute programming code (hereinafter referred to as "code") and/or to process an error identified within the code. The DCS may include a set of computing devices, server devices, or some combination of computing devices and server devices. One or more of the computing devices and/or server devices may execute all or a portion of the code. The DCS may determine whether to raise an exception associated with the identified error and/or to process the error using an error handler. The DCS may raise an exception, associated with an error, when the DCS determines that a condition under which the error is detected satisfies a programmer specified condition identified in a protected instruction. The DCS may not raise an exception when the condition, under which the error is detected, does not satisfy the programmer specified condition. When the exception is not raised, the DCS may not transfer control to an error handler and/or may continue to execute the code.

When the exception is raised, the DCS may process the error using an error handler associated with the protected instruction. Additionally, or alternatively, the DCS may process the error based on an error handling instruction that includes programmer specified instructions that cause the error to be processed in a manner specified by the programmer.

Raising exceptions based on programmer specified conditions and/or processing errors based on programmer specified error handling instructions may permit the programmer to control a manner in which errors, within a code, are identified and/or processed. The programmer specified conditions and/or or error handling instructions may allow the programmer to control a manner in which different types of errors are identified and/or processed, manage a quantity of errors being handled over a period of time, and/or avoid an unplanned service disruption and/or shutdown of devices and/or networks on which the code is executing.

Figure 1A:
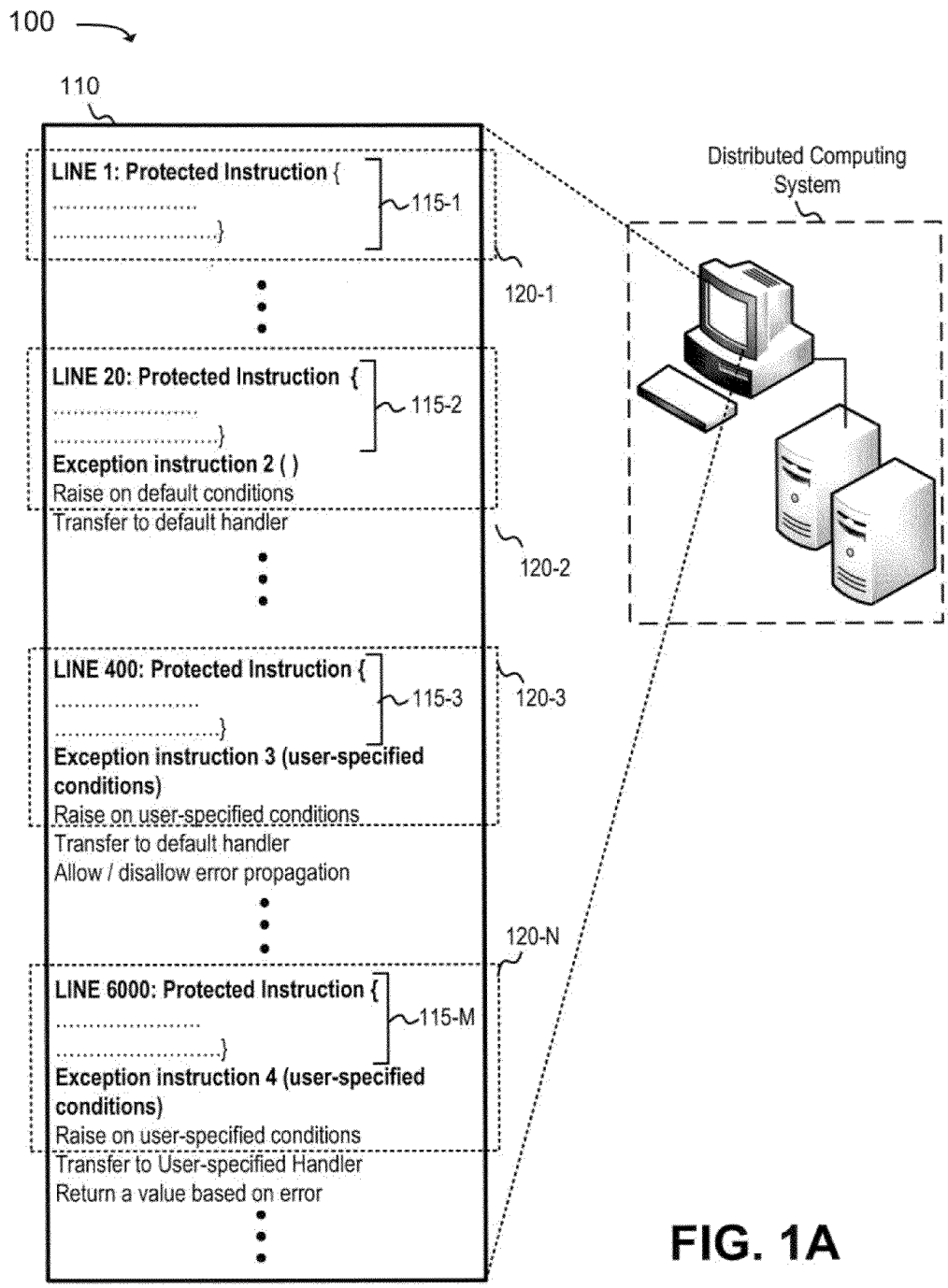
FIGS. 1A and 1B are diagrams illustrating an overview of an example implementation described herein.
Figure 1B:
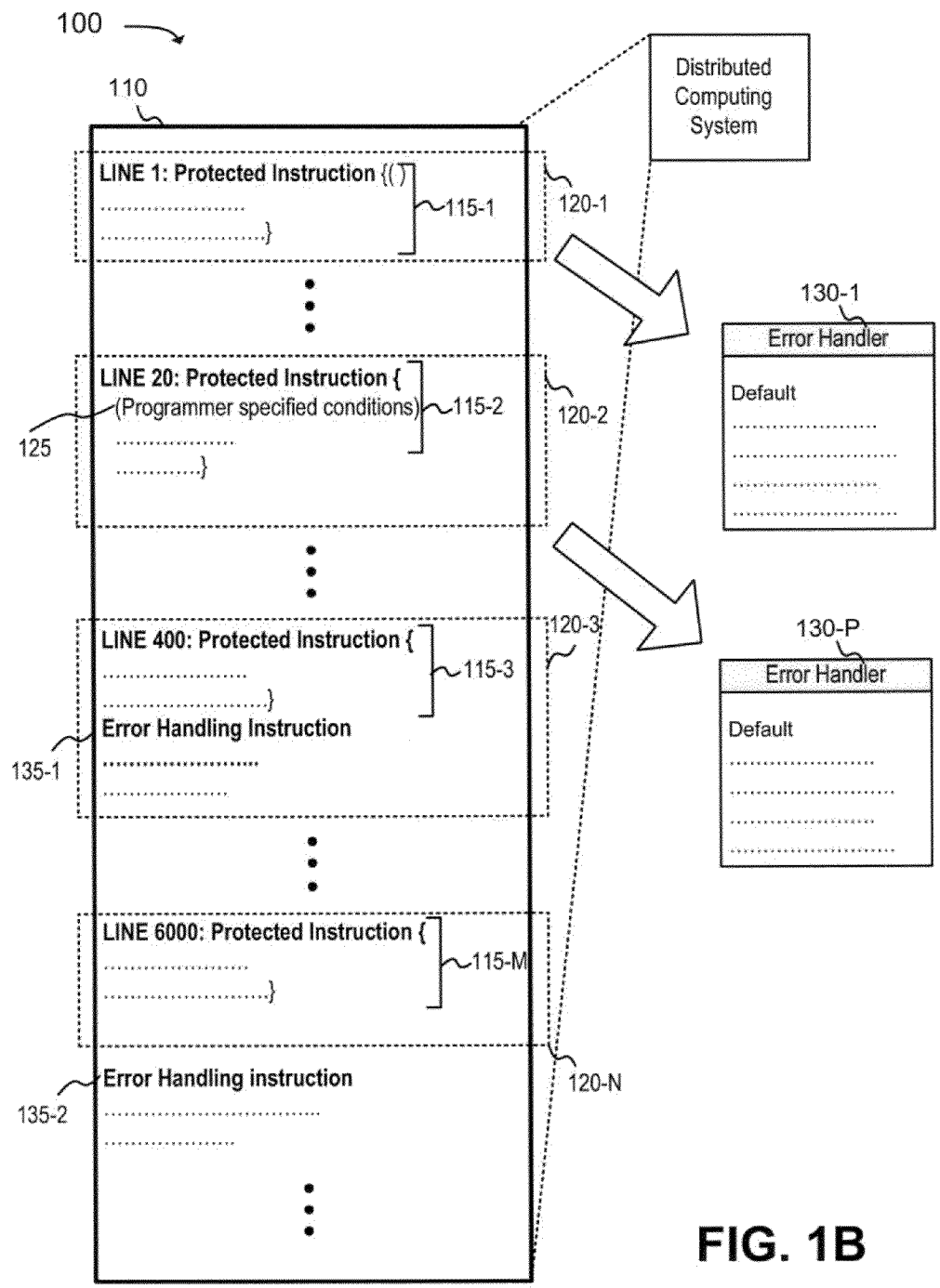

FIGS. 1A and 1B are diagrams illustrating an overview 100 of an example implementation described herein. As shown in FIG. 1A, a distributed computing system (DCS) may store programming code 110 (hereinafter referred to as "code 110") that includes lines of code associated with a group of protected instructions 115-1, ..., 115-M (where M≥1) (hereinafter referred to collectively as "protected instructions 115" and individually as "protected instruction 115") and a group of code regions 120-1, ..., 120-N (where N≥1) (hereinafter referred to collectively as "regions 120" and individually as "region 120").

Protected instruction 115 may be associated with one or more lines of code, within code 110, that perform a respective act, operation, and/or computation when code 110 is executed by the DCS. In one example implementation, protected instruction 115 may correspond to a function, within code 110, that performs a respective act, operation, and/or computation when code 110 is executed. The function may also, or alternatively, take on a different form based on a type of programming code (e.g., C, C++, C#, Java, Javascript, Sawzall, etc.) to which code 110 corresponds.

Region 120 may be associated with a particular protected instruction 115. In one example implementation, region 120 may correspond to a protected region, within code 110, associated with a protected instruction. The protected region may take on a different form based on the type of programming code to which code 110 corresponds. The protected region may, for example, include lines of code associated with protected instruction 115, a portion of the lines of code associated with protected instruction 115, and/or other lines of code in addition to the lines of code associated with protected instruction 115. As shown in FIG. 1A, region 120-1 may correspond to protected instruction 115-1, region 120-2 may correspond to protected instruction 115-2, region 120-3 may correspond to protected instruction 115-3, and so on.

As shown in FIG. 1B, code 110 may include protected instructions 115 and regions 120 identified in FIG. 1A as well as a programmer specified condition 125, a group of error handlers 130-1, ..., 130-P (where P≥1) (hereinafter referred to collectively as "error handlers 130" and individually as "error handler 130"), and a pair of error handling instructions 135-1 and 135-2 (hereinafter referred to collectively as "error handling instructions 135" and individually as "error handling instruction 135").

Programmer specified condition 125 may identify a condition, associated with protected instruction 115 (e.g., protected instruction 115-2), under which the DCS is to raise an exception when a particular error is identified within protected instruction 115-2. The DCS may, for example, raise the exception when a type of error and/or conditions, under which the error is detected, satisfies programmer specified condition 125. Programmer specified condition 125 may identify a condition that causes the DCS to raise an exception when the condition is satisfied. In one example, programmer specified condition 125 may be stored within a field associated with protected instruction 115. Additionally, or alternatively, the DCS may not raise the exception when a condition, under which the error is detected, does not satisfy programmer specified condition 125. When the exception is not raised, the DCS may execute a next line of code and may determine whether the error and/or a different error is detected within the next line of code. The DCS may, in a manner similar to that described above, determine whether a condition, under which the error and/or the different error is detected in the next line of code, satisfies programmer specified condition 125.

Additionally, or alternatively, programmer specified condition 125 may cause the DCS to raise an exception to an error, detected within another region 120 (e.g., different than region 120-2) that is not associated with protected instruction 115-2, when an error propagates from region 120-2 to the other region 120. When protected instruction 115 does not include programmer specified condition 125, such as protected instruction 115-1, the DCS may associate predetermined default conditions (e.g., conditions that are not programmer specified) with protected instruction 115.

The DCS may transfer control to an error handler 130 to process an error to which an exception is raised. Error handler 130 (sometimes referred to as a "default error handler 130") may include an application that, when executed by the DCS, processes the error and transfers control back to code 110 after processing the error. Alternatively, transferring control to error handler 130 may cause error handler 130 to terminate execution of code 110. Processing the error and/or terminating execution of code 110 may include generating a report based on information associated with the error. The information associated with the error may identify a location, within code 110, where the error was detected (e.g., a line of code); a variable with which the error is associated; region 120 and/or protected instruction 115 in which the error is detected, etc.

Error handling instruction 135 may include one or more lines of code, that when executed by the DCS, processes an error to which an exception is raised. Error handling instruction 135 may, for example, allow a programmer, associated with the DCS, to specify a manner in which to process an error, to which an exception is raised, that is different than processing the error using error handler 130.

By way of example, the DCS may execute code 110 and may identify an error associated with protected instruction 115-1, within region 120-1, that does not include programmer specified condition 125 (e.g., as shown by empty parentheses "( )"). The DCS may associate a default condition with protected instruction 115-1 when programmer specified condition 125 is not associated with protected instruction 115-1. The DCS may also, or alternatively, raise an exception to an error that is detected under a condition that satisfies the default condition associated with protected instruction 115-1. Additionally, or alternatively, the DCS may, as a result of raising the exception, transfer control to a default error handler 130-1 when a programmer-specified error handler (e.g., error handling instruction 135) is not associated with region 120-1. When the exception is not raised, the DCS may not transfer control to default error handler 130-P and may continue to execute the code.

Additionally, or alternatively, the DCS may identify an error associated with protected instruction 115-2, within region 120-2, that includes programmer specified condition 125. The DCS may use default error handler 130-P, associated with region 120-2, to process the error when a condition under which the error is detected satisfies programmer specified condition 125 and/or a default condition, and/or when a programmer-specified error handler is not associated with region 120-2. When the exception is not raised, the DCS may not transfer control to default error handler 130-P and may continue to execute the code.

Additionally, or alternatively, the DCS may identify an error, associated with protected instruction 115-3, within region 120-3 that includes error handling instruction 135-1. The DCS may, in a manner similar to that described above, raise an exception with respect to the error when a condition, under which the error is detected, satisfies a default condition (e.g., when programmer specified condition 125 is not specified within protected instruction 115-3) and/or programmer specified condition 125 (e.g., when programmer specified condition 125 is specified within protected instruction 115-

3). The DCS may process the error by executing error handling instruction 135-1 when the exception is raised. Additionally, or alternatively, another error handling instruction 135 (e.g., 135-2) may be associated with protected instruction 115 (e.g., protected instruction 115-M) without being included within region 120 with which protected instruction 115 is associated (e.g., region 120-N). In a manner similar to that described above, the DCS may process an error, associated with protected instruction 115-M and to which an exception is raised, by executing error handling instruction 135-2.

Figure 2:
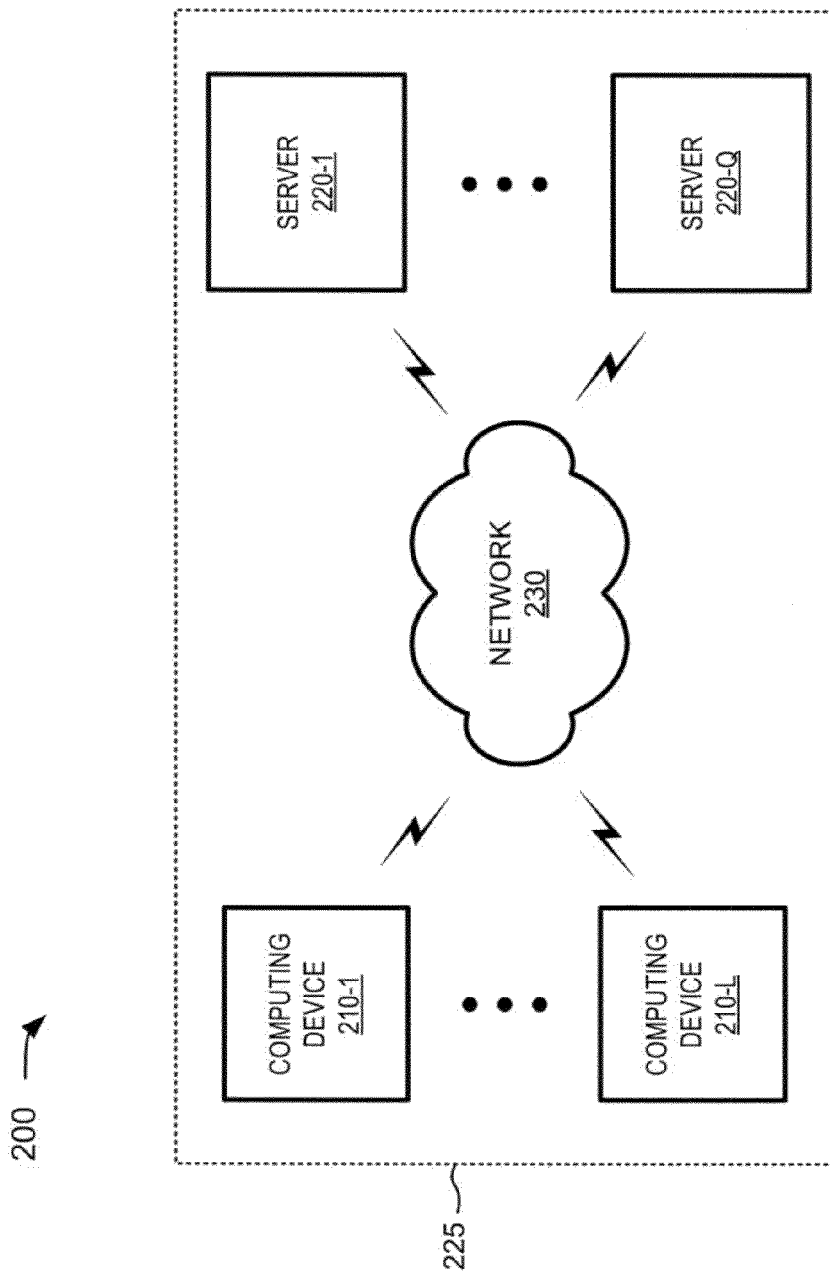
FIG. 2 is a diagram of an example environment in which systems and/or methods described herein may be implemented.

FIG. 2 is a diagram of an example environment 200 in which systems and/or methods described herein may be implemented. Environment 200 may include a group of computing devices 210-1, ..., 210-L (where L≥1) (hereinafter referred to collectively as "computing devices 210" and individually as "computing device 210"), a group of servers 220-1, ..., 220-Q (where Q≥1) (hereinafter referred to collectively as "servers 220" and individually as "server 220"), a distributed computing system 225, and a network 230. The quantity of devices, systems, and/or networks within environment 200 is provided for explanatory purposes. In other implementations, there may be fewer devices, systems, and/or networks, additional devices, systems, and/or networks, different devices, systems, and/or networks, and/or differently arranged devices, systems, and/or networks than are provided in environment 200.

Also, in some implementations, one or more of the devices and/or systems, of environment 200, may perform one or more functions described as being performed by another one or more devices and/or systems of environment 200. The devices of environment 200 may interconnect via wired connections, wireless connections, or a combination of wired and wireless connections.

Computing device 210 may include one or more devices, such as a personal computer, a laptop, a tablet computer, a server device, a wireless device, such as a mobile phone, a smart phone, or a personal digital assistant (PDA) or another type of computation or communication device. In one example implementation, computing device 210 may host an application that permits computing device 210 to generate, analyze, compile, debug, execute and/or perform other operations on programming code (e.g., code 110) stored by computing device 210. Computing device 210 may, for example, analyze and/or execute all or a portion of code 110 to identify one or more errors within code 110. Computing device 210 may also, or alternatively, raise exceptions to errors identified as a result of analyzing and/or executing code 110 based on one or more protected instructions 125 included within code 110. Computing device 210 may also, or alternatively, perform error handling on an error for which an exception is raised. Computing device 210 may use the application or a different application, associated with error handler 130 (e.g., default error handlers 130) to process the error.

Server 220 may include one or more server devices, or other types of computation or communication devices, that gather, process, search, store, and/or provide information in a manner described herein. Server 220 may, for example, store an application that allows all or a portion of code 110 to be analyzed and/or executed by server 220 in a manner similar to that described above. In one example, server 220 may analyze all or a portion of code 110, in a distributed manner, in conjunction with computing device 210 and/or another server 220. Server 220 may receive an instruction, from computing device 210, to analyze and/or execute all or the portion of code 110 and server 220 may analyze and/or execute code 110 in response to the instruction. Server 220 may exchange information (e.g., variables, values, etc.) with computing device 210 and/or another server 220 that allows instantiations of code 110 to be analyzed and/or executed in the distributed manner.

Additionally, or alternatively, computing device 210 may communicate with one or more computing devices 210 and/or servers 220 to create DCS 225. DCS 225 may permit one or more instantiations of all or a portion of code 110 to be analyzed and/or executed, in a distributed manner, on one or more computer devices 210 and/or servers 220. Additionally, or alternatively, computing device 210 may host one or more virtual machines that may emulate one or more computing devices 210, one or more servers 220, and/or DCS 225. Each virtual machine may execute a respective operating system, utilize respective processing resources, and/or execute respective applications that are hosted by computing device 210. Each virtual machine may, when executed by computing device 210, perform some or all of the functions performed by computing device 210, server 220, and/or DCS 225. In the description below, implementations are described as being performed by computing device 210 for simplicity. Additionally, or alternatively, the implementations may be performed by one or more virtual machines executing on computing device 210. Additionally, or alternatively, the implementations could be performed by one or more computing devices 210, one or more servers 220, or a combination of computing devices 210 and/or servers 220 acting as DCS 225.

Network 230 may include one or more wired and/or wireless networks. For example, network 230 may include a cellular network, a public land mobile network (PLMN), a second generation (2G) network, a third generation (3G) network, a fourth generation (4G) network, a fifth generation (5G) network, and/or another network. Additionally, or alternatively, network 230 may include a wide area network (WAN), a metropolitan area network (MAN), a telephone network (e.g., the Public Switched Telephone Network (PSTN)), an ad hoc network, an intranet, the Internet or a combination of these or other types of networks.

Figure 3:
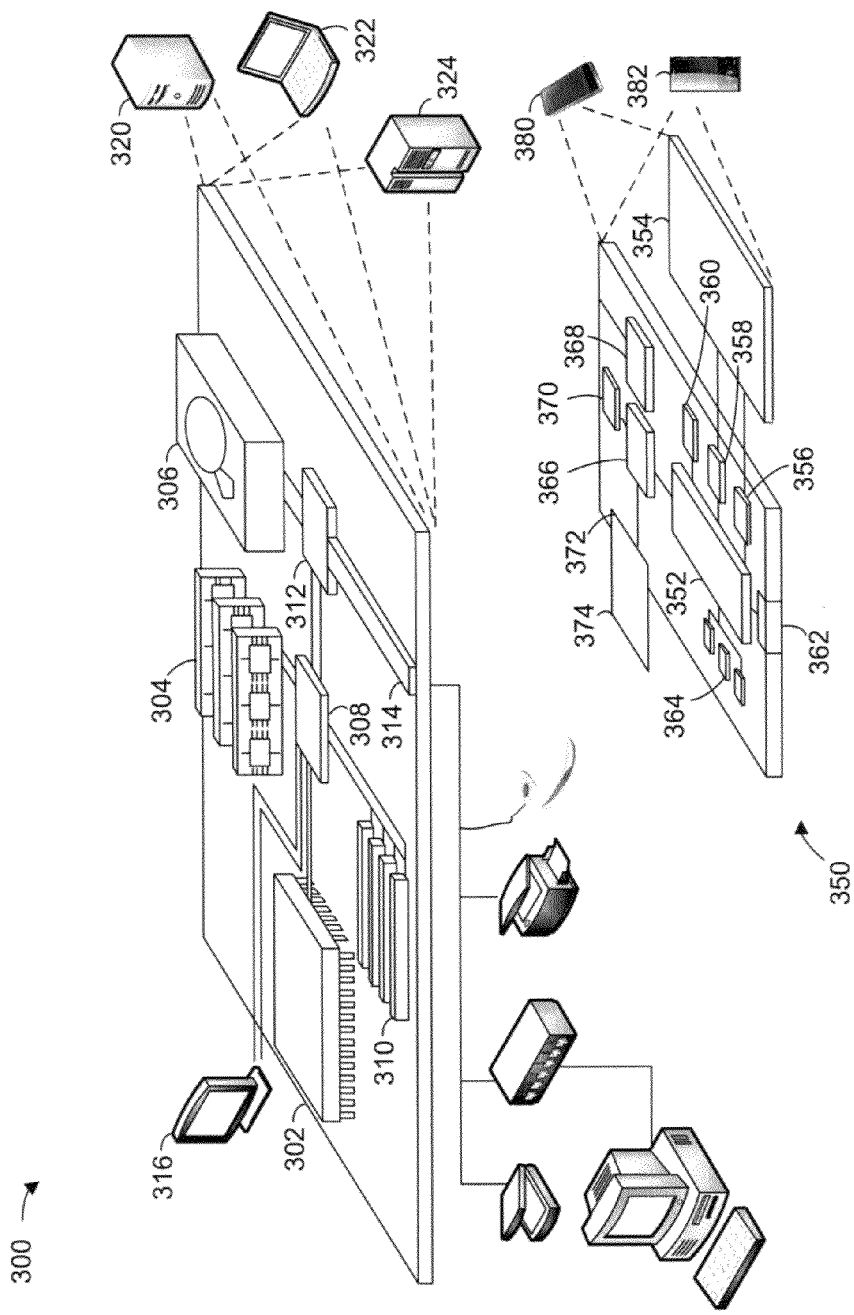
FIG. 3 is a diagram of an example generic computing device and a generic mobile computing device.

FIG. 3 is a diagram of an example of a generic computing device 300 and a generic mobile computing device 350, which may be used with the techniques described here. Generic computing device 300 or generic mobile computing device 350 may, for example, correspond to a computing device 210 and/or a server 220. Additionally, or alternatively, computing device 210 and/or server 220 may include one or more computing devices 300 or mobile computing devices 350, and/or one or more components of computing device 300 and/or mobile computing devices 350.

Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown in FIG. 3, their connections and relationships, and their functions, are meant to be examples only, and are not meant to limit implementations described herein.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. Processor 302 can process instructions for execution within the computing device 300, including instructions stored in the memory 304 or on the storage device 306 to display graphical information for a graphical user interface (GUI) on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations, as a server bank, a group of blade servers, or a multi-processor system, etc.

Memory 304 stores information within the computing device 300. In one implementation, memory 304 includes a volatile memory unit or units. In another implementation, memory 304 includes a non-volatile memory unit or units. The memory 304 may also be another form of computer-readable medium, such as a magnetic or optical disk. A computer-readable medium may refer to a non-transitory memory device. A memory device may refer to storage space within a single storage device or spread across multiple storage devices.

The storage device 306 is capable of providing mass storage for the computing device 300. In one implementation, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or memory on processor 302.

High speed controller 308 manages bandwidth-intensive operations for the computing device 300, while low speed controller 312 manages lower bandwidth-intensive operations. Such allocation of functions is provided for explanatory purposes only. In one implementation, high-speed controller 308 is coupled to memory 304, display 316 (e.g., through a graphics processor or accelerator), and to high-speed expansion ports 310, which may accept various expansion cards (not shown). In this implementation, low-speed controller 312 is coupled to storage device 306 and low-speed expansion port 314. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as mobile computing device 350. Each of such devices may contain one or more of computing devices 300, 350, and an entire system may be made up of multiple computing devices 300, 350 communicating with each other.

Mobile computing device 350 may include a processor 352, memory 364, an input/output ("I/O") device such as a display 354, a communication interface 366, and a transceiver 368, among other components. Mobile computing device 350 may also be provided with a storage device, such as a micro-drive or other device, to provide additional storage. Each of the components 350, 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD (Thin-Film-Transistor Liquid Crystal Display) or an OLED (Organic Light Emitting Diode) display, or other appropriate display technology. Display interface 356 may comprise appropriate circuitry for driving display 354 to present graphical and other information to a user. Control interface 358 may receive commands from a user and convert them for submission to the processor 352. In addition, an external interface 362 may be provided in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a SIMM (Single In Line Memory Module) card interface, a DIMM (Dual In Line Memory module) card interface, etc. Such expansion memory 374 may provide extra storage space for device 350, or may also store applications or other information for mobile computing device 350. Specifically, expansion memory 374 may include instructions to carry out or supplement the processes described above, and may include secure information also. Thus, for example, expansion memory 374 may be provide as a security module for mobile computing device 350, and may be programmed with instructions that permit secure use of device 350. In addition, secure applications may be provided via the SIMM cards, along with additional information, such as placing identifying information on the SIMM card in a non-hackable manner.

Expansion memory 374 may include, for example, flash memory and/or NVRAM memory. In one implementation, a computer program product is tangibly embodied in an information carrier. The computer program product contains instructions that, when executed, perform one or more methods, such as those described above. The information carrier is a computer-or machine-readable medium, such as the memory 364, expansion memory 374, or memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound (e.g., voice messages, music files, etc.) and may also include sound generated by applications operating on mobile computing device 350.

Mobile computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device (e.g., magnetic discs, optical disks, memory, Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a LAN, a WAN, and the Internet.

Figure 4A:
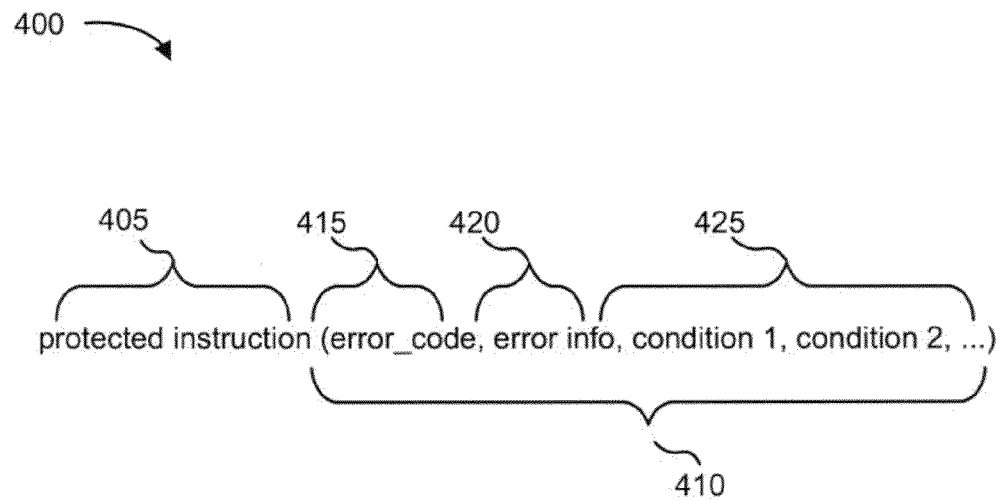
FIG. 4A is a diagram of an example protected instruction that identifies a manner in which an exception, associated with an error, is to be raised based on one or more programmer specified conditions.

FIG. 4A is a diagram of an example protected instruction 400 that identifies a manner in which an exception, associated with an error, is to be raised based on one or more programmer specified conditions. Protected instruction 400 may govern a manner in which an exception is raised when an error is identified within region 120 with which protected instruction 400 is associated. In one example, protected instruction may correspond to protected instruction 115 of FIGS. 1A and 1B. Protected instruction 400 may include an instruction field 405 and a programmer specified condition field 410.

Instruction field 405 may include information (e.g., an instruction name, label, identifier, etc.) that uniquely identifies protected instruction 400 from other types of instructions (e.g., an error handling instruction 135, etc.) used in a programming language. Instruction field 405 may cause computing device 210 to raise an exception (e.g., when programmer specified conditions are satisfied), and to transfer program control, from code 110, to default error handler 130 that is predetermined by computing device 210 and/or an application, being executed by computing device 210, that enables the programmer to develop, edit, compile, and/or execute code 110. Instruction field 405 may also cause computing device 210 to perform a function (e.g., compute a value, perform an act, etc.) when an error is not detected and/or an exception is not raised. In one example, instruction field 405 may cause computing device 210 to generate a result that indicates that an error, for which an exception is not raised, has been detected and/or that includes information associated with the error (e.g., a line code in which error is detected, a variable with which the error is associated, a condition under which the error is detected, etc.). Additionally, or alternatively, instruction 405 may associate an error value with the error and/or with information associated with the error. The error value may enable computing device 210 to determine whether a next line of code includes an error when the variable, with which the error value is associated, is detected in the next line of code.

Programmer specified condition field 410 may include a collection of fields, such as an error code field 415, an error information field 420, and a programmer specified condition field 425. Error code field 415, error information field 420, and/or programmer specified condition field 425 may be specified by a programmer associated with computing device 210. Error code field 415 may permit computing device 210 to associate a programmer specified value or string (e.g., 0, 1, 2, 3, a, b, c, etc.) with an error when computing device 210 raises an exception associated with the error. Error information field 420 may allow computing device 210 to identify information, associated with the error, when computing device 210 raises an exception associated with the error. The information, associated with the error, may identify a line of code in which the error is detected, a type of error (e.g., divide by zero, syntax, etc.), a runtime at which the error is detected, region 120 with which the error is associated, protected instruction 400 in which the error is detected, a variable with which the error is associated, etc.

Condition field 425 may identify a condition under which an exception, associated with the error, is to be raised. The condition may be specified by the programmer and/or may be unique to a type of programming language associated with code 110. In one example, condition field 425 may include a first condition (e.g., a raise on use condition) indicating that an exception, associated with an error, is to be raised when the error is used within a line of code (e.g., i=k+t, where i, k, and t are variables within a line of code and t is associated with an error). Additionally, or alternatively, condition field 425 may identify a second condition or combination of conditions (e.g., a raise on use, a raise on escape condition, etc.) indicating that an exception is to be raised when an error, associated with a first region 120, is used by a line of code associated with a second region 120 (sometimes referred to as "error propagation"). In this example, a condition under which the exception to the error, within the second region 120, is raised may be inherited from condition field 425 of the first region 120.

Additionally, or alternatively, condition field 425 may include a third condition (e.g., a raise on creation condition) indicating that an exception is to be raised when a program state is corrupted and cannot continue to be executed. Additionally, or alternatively, condition field 425 may include a fourth condition (e.g., a raise on output condition) indicating that an exception, associated with an error, is to be raised when the information that has been incorrectly generated, due to the error, is being output by code 110. Additionally, or alternatively, condition field 425 may include a fifth condition (e.g., a raise on condition) indicating that an exception, associated with an error, is to be raised when a conditional expression evaluates to true (e.g., when i=t, raise an exception, where i and t are variables within a line of code). Protected instruction 400 may include any one of the conditions or a combination of two or more of the conditions. The quantity of conditions, within condition field 425, is provided for explanatory purposes. In another implementation, there may be additional conditions, fewer conditions, or different conditions than are described with respect to condition field 425.

Figure 4B:
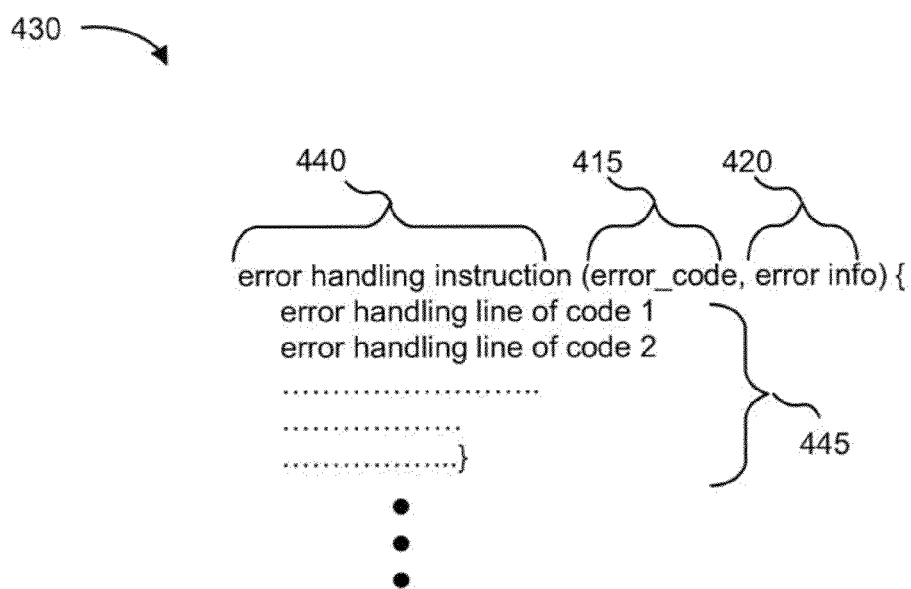
FIG. 4B is a diagram of an example error handling instruction that identifies programmer-specified error handling to be performed on an error for which an exception has been raised.

FIG. 4B is a diagram of an example error handling instruction 430 that may be executed, by computing device 210, to process an error when an exception to the error is raised. Error handling instruction 430 may be provided by a programmer, of computing device 210, to perform error handling on an error in a manner intended by the programmer. In one example, error handling instruction 430 may correspond to error handling instruction 135 of FIG. 1B. As shown in FIG. 4B, error handling instruction 430 may include a collection of fields, such as fields 415 and 420 of FIG. 4A, as well as an instruction field 440 and an error handling code field 445.

Instruction field 440 may include information (e.g., an instruction name, label, identifier, etc.) that uniquely identifies error handling instruction 430 from other types of instructions (e.g., protected instruction 400 of FIG. 4A, etc.) included within code 110. Instruction field 440 may, for example, cause computing device 210 to perform a programmer specified error handling operation on an error for which an exception is raised by computing device 210. Error handling code field 445 may include one or more lines of code (e.g., shown between brackets { }) that identify a programmer specified manner in which an error, for which an exception is raised, is to be processed when computing device 210 executes the one or more lines of code. Processing the error, in the manner specified by the programmer, may allow error handling to be performed differently than error handling using default error handler 130. For example, the programmer may specify lines of code that cause execution of code 110 to terminate based on a type of error; a value to be returned based on a type of error; the error to be ignored based on a type of error; to allow the error to propagate to another region 120; to confine the error to region 120; etc. Additionally, or alternatively, the lines of code may cause program control to be transferred to another application that processes the error in a manner specified by the programmer.

The quantity of fields included within protected instruction 400 of FIG. 4A and error handling instruction 430 of FIG. 4B is provided for explanatory purposes only. In another example implementation, protected instruction 400 of FIG. 4A and/or error handling instruction 430 of FIG. 4B may include additional fields, fewer fields, different fields, or differently arranged fields than are shown in FIGS. 4A and 4B, respectively. Additionally, or alternatively, protected instruction 400 of FIG. 4A and error handling instruction 430 of FIG. 4B are provided in generic forms that are intended to be agnostic with respect to a specific programming language (e.g., C, C++, C#, Java, Javascript, Sawzall, etc.). In another example implementation, protected instruction 400 of FIG. 4A and/or error handling instruction 430 of FIG. 4B may take forms, that are different than the generic forms, intended to be compatible with a specific programming language. Thus, the generic forms of protected instruction 400 of FIG. 4A and error handling instruction 430 of FIG. 4B are provided for explanatory purposes only.

Figure 5:
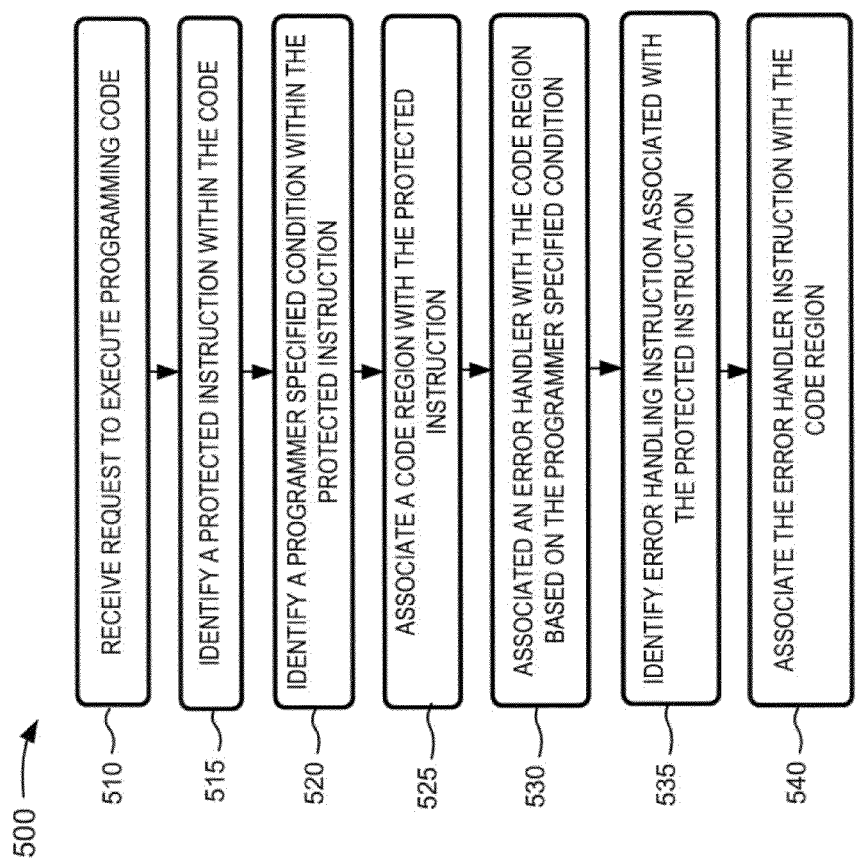
FIG. 5 is a flowchart of an example process for executing programming code to identify and/or process an error within the programming code.

FIG. 5 is a flowchart of an example process 500 for analyzing programming code that allows an error, within the programming code, to be processed. In one implementation, some or all of process 500 may be performed by computing device 210. In another example implementation, process 500 may be performed by a device or collection of devices separate from, or in combination with, computing device 210.

As shown in FIG. 5, process 500 may include receiving a request to execute programming code (block 510) and identifying a protected instruction within the code (block 515). For example, a programmer, associated with computing device 210, may instruct computing device 210 to execute code that enables computing device 210 to detect and/or process an error within the code. Computing device 210 may receive the request and may retrieve the code from a memory associated with computing device 210. Additionally, or alternatively, computing device 210 may communicate with one or more servers 220 and/or another computing device 210 to retrieve and/or access the code. Computing device 210 may analyze one or more lines, associated with the code, to identify a protected instruction (e.g., protected instruction 400 of FIG. 4A) within the code. Computing device 210 may identify the protected instruction based on a determination that one or more terms, in the line of code, match terms, associated with protected region 400, stored in a memory associated with computing device 210.

As also shown in FIG. 5, process 500 may include identifying a programmer specified condition within the protected instruction (block 520), associating a code region with the protected instruction (block 525), and associating an error handler with the code region based on the programmer specified condition (block 530). For example, computing device 210 may determine whether a protected instruction includes one or more fields that identify one or more programmer specified conditions (e.g., programmer specified condition 410 of FIG. 4A) to be used to determine whether to raise an exception when an error, associated with the protected instruction, is identified. Computing device 210 may also, or alternatively, associate the programmer specified condition with a code region (e.g., region 120). Additionally, or alternatively, computing device 210 may identify an error handler (e.g., a default error handler 130) with which to associate with the protected region based on the association of the protected instruction with the code region and/or the programmer specified conditions with the code region. Association of the programmer specified condition with code region may enable computing device 210 to raise an exception to an error when conditions, under which an error within the code region is detected, satisfy the programmer specified conditions and/or programmer specified conditions inferred from another code region. Computing device 120, in this example, may transfer control to the error handler. If, however, the protected instruction does not include the programmer specified condition, computing device 120 may transfer control to the error handler when a condition, under which an error is detected, satisfy default conditions predetermined by computing device 210.

Additionally, or alternatively, computing device 210 may associate a code region (e.g., region 120) with lines of code associated with the protected instruction. Region 120 may include a portion of the lines of code associated with the protected instruction; all of the lines of code associated with the protected instruction; or all or a portion of the lines of code associated with the protected instruction as well as lines of code associated with another instruction (e.g., an error handling instruction, etc.).

As further shown in FIG. 5, process 500 may include identifying an error handling instruction associated with the protected instruction (block 535) and associating the error handling instruction with the code region (block 540). For example, computing device 210 may identify, within the code, an error handling instruction (e.g., error handling instruction 430 of FIG. 4B) associated with the protected instruction based on a determination that one or more terms, in a line of code, match terms, associated with the error handling instruction, stored in the memory. Computing device 210 may also, or alternatively, determine that the error handling instruction is associated with the protected instruction when the error handling instruction is logically associated with the protected instruction. The logical association may permit the error handling instruction to be associated with code region and/or the protected instruction regardless of where, within the code, the error handling instruction is located. Association of the handling instruction with the code region and/or protected instruction may cause the error handling instruction to be executed when an error is detected within the protected instruction and/or when an exception is raised based on the detection of the error.

Figure 6:
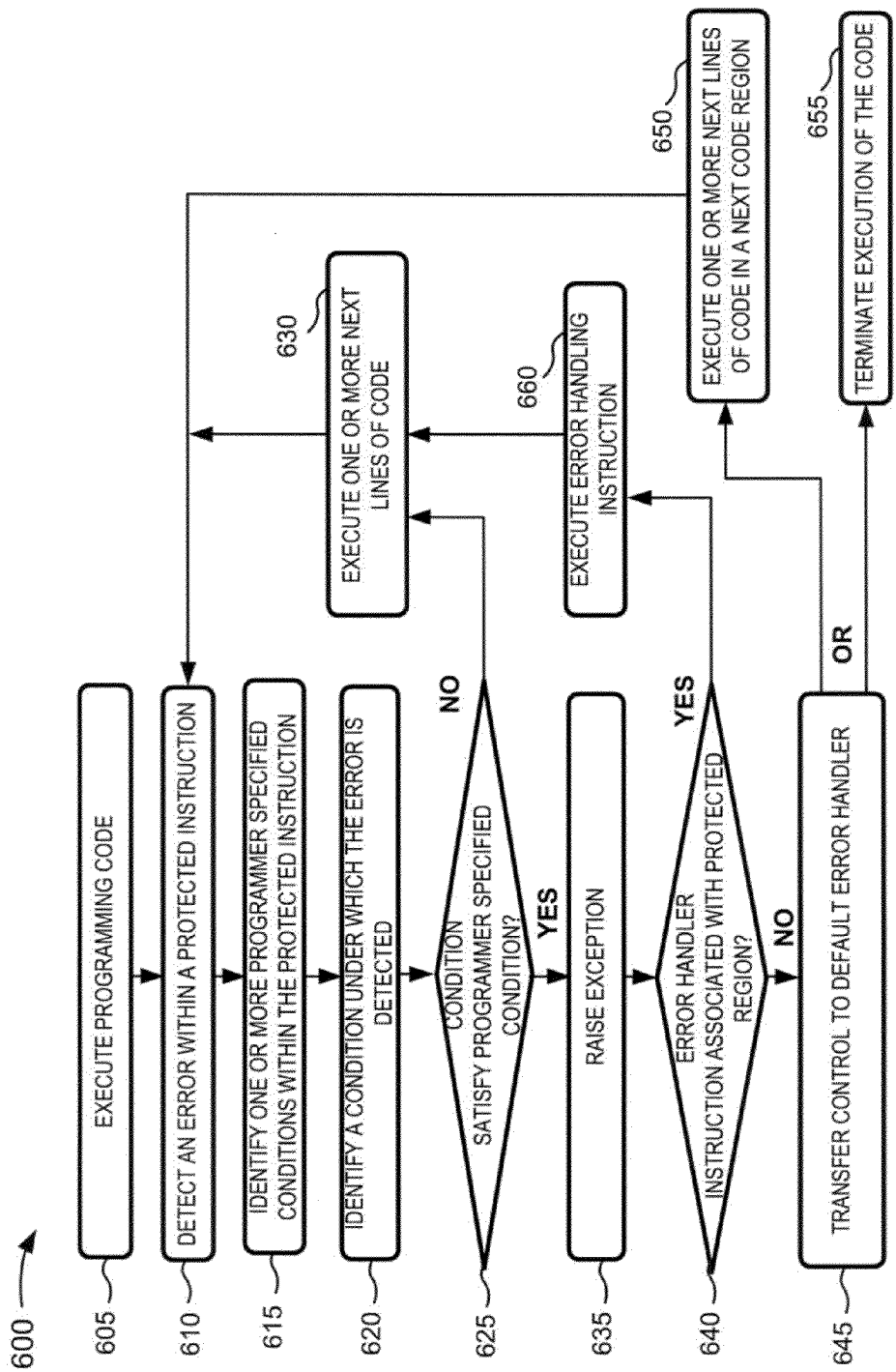
FIG. 6 is a flowchart of an example process for handling and/or processing an error, within programming code, based on one or more protected instructions and/or error handling instructions included within the programming code.

FIG. 6 is a flowchart of an example process 600 for identifying and/or processing an error, within programming code, based on one or more protected instructions and/or error handling instructions included within the programming code. In one implementation, some or all of process 600 may be performed by computing device 210. In another example implementation, process 600 may be performed by a device or collection of devices separate from, or in combination with, computing device 210. FIG. 7 is a diagram of example programming code 700 (hereinafter referred to as "code 700") that includes one or more protected instructions and/or error handling instructions. Some or all of process 700 of FIG. 7 will be described below with references to code 700 of FIG. 7.

As shown in FIG. 6, process 600 may include executing programming code (block 605) and detecting and error within a protected instruction (block 610). For example, computing device 210 may obtain all or a portion of code 110 and may execute lines of code associated with code 110.

For example, as shown in FIG. 7, code 700 may, in a manner similar to that described in FIGS. 1A and 1B, include a group of protected instructions 705-1-705-3 (hereinafter referred to collectively as "functions 705" and individually as "function 705"), a group of code regions 710-1-710-3 (hereinafter referred to collectively as "regions 710" and individually as "region 710"), and an error handling instruction 715. Some lines of code, within code 700, may include comments (e.g., identified by a symbol "#" followed by text in FIG. 7) that describes one or more features associated with the lines of code. The comments may not be executed by computing device 210 and/or may be provided by the programmer as a development aid, an error handling aid, etc.

Computing device 210 may, for example, execute code 700. For example, computing device 210 may execute a first line of code within code 700 (e.g., shown as x; =functionC( )) in FIG. 7), which may cause computing device 210 to execute one or more lines of code associated with function 705-3 (e.g., functionC) within code 700. When executing the lines of code associated with function 705-3 (e.g., shown as x:int=functionB(0) in FIG. 7), function 705-2, within code 700, may be called (e.g., functionB), which may cause computing device 210 to execute one or more lines of code associated with function 705-2. When executing the lines of code associated with function 705-2 (e.g., shown as t:int=functionA(i) in FIG. 7), function 705-1, within code 700 may be called (e.g., functionA), which may cause computing device 210 to execute one or more lines of code associated with function 705-1 (e.g., shown as j:int=create exception (error_code, error_info, raise_on_use, raise_on_escape) in FIG. 7) within a first region 710 (e.g., region 710-1) of code 700.

Returning to FIG. 6, computing device 210 may detect an error within a line of code associated with a protected instruction. Assume, in the description below, that an error is detected with respect to a variable (e.g., variable j) within a line of code associated with a protected instruction (e.g., shown as j:int=create exception (error_code, error_info, raise_on_use, raise_on_escape) in FIG. 7). Computing device 210 may execute each line of code associated with the protected instruction and may produce a respective error result based on executing each of the one or more lines of code that includes the error.

As also shown in FIG. 6, process 600 may include identifying one or more programmer specified conditions within the protected instruction (block 615) and identifying a condition under which the error is detected (block 620). For example, computing device 120 may identify one or more programmer specified conditions associated with the protected instruction. For example, as shown in FIG. 7, computing device 210 may determine that a first programmer specified condition, associated with function 705-1, indicates that an exception is to be raised when a variable, with which the error is associated, is used within the line of code associated with the function 705-1 (e.g., shown as "raise_on_use" in FIG. 7). When generating the error result, computing device 210 may, for example, generate information associated with the error (e.g., a run time when the error is detected, a line of code in which the error is detected, a condition under which the error is detected, a type of error, etc.). Computing device 210 may also, or alternatively, associated an error value with the variable with which the error is associated. Computing device 210 may also, or alternatively, associate the error value with the information associated with the error and may store the error value and/or the information associated with the error in a memory (e.g., in an error table) associated with computing device 210.

Additionally, or alternatively, computing device 210 may determine that a second programmer specified condition, associated with function 705-1, indicates that an exception is to be raised when an error escapes from region 710-1 (e.g., shown as "raise_on_escape" in FIG. 7). The error may escape first region 710 when computing device 210 executes a line of code, in another region 710 (e.g., region 710-2, 710-3, etc.), that generates an error result indicating that a variable, with which the error is associated, is used by the other line of code. In this example, the error may be determined to have escaped from the region and/or to have propagated to the other region 710. Additionally, or alternatively, the programmer specified condition, associated with the protected instruction, may be inherited by the other region which may cause computing device 210 to raise an exception.

Returning to FIG. 6, computing device 210 may identify a condition under which the error is detected based on an error result that is generated by computing device 210 when executing a line of code. For example, computing device 210 may execute a line of code (e.g., shown as k:int=0, in FIG. 7) and may not generate an error result when the line of code is not associated with (e.g., does not use) the variable with which the error value is associated.

If the condition does not satisfy the programmer specified condition (block 625—NO), then process 600 may include executing one or more next lines of code (block 630). For example, computing device 210 may not raise an exception when the error result indicates that the error has not been used by the line of code and/or that the error has not escaped to another region of the code. Thus, computing device 210, may not raise an exception when an error result is not generated when the line of code is executed and/or when an error result identifies a condition that does not satisfies the programmer specified condition. Additionally, or alternatively, computing device 210 may execute a next line of code (e.g., shown as k=i+j in FIG. 7) when the condition does not satisfy the programmer specified condition.

If the condition satisfies the programmer specified condition (block 625—YES), then process 600 may include raising an exception (block 635). For example, computing device 210 may execute the next line of code (e.g., shown as k=i+j in FIG. 7) and may generate an error result that identifies a condition under which the error is detected within the executed line of code. Computing device 210 may, for example, determine that a variable (e.g., j), with which the error is associated, is being used by the line of code based on the error result. In this example, computing device 210 may determine that an error value is associated with the variable and thus impacts and/or is being used in the line of code.

Additionally, or alternatively, computing device 210 may determine that condition under which the error is detected satisfies the first programmer specified condition (e.g., raise_on_use) identified by the protected instruction (e.g., function 705-1 of FIG. 7). When the condition, under which the error is detected satisfies the first programmer specified condition, computing device 210 may raise an exception associated with the error. Additionally, or alternatively, computing device 210 may not execute a next line of code (e.g., shown as return 10 in FIG. 7), within first region 710 (e.g., region 710-1), that follows the line of code in which the error is being used.

Additionally, or alternatively, computing device 210 may, as a result of raising the exception based on the protected instruction, associate a value and/or string (e.g., 0, 1, 2, a, b, a13b, etc.) (hereinafter referred to as "error code") with the error that corresponds to an error code field associated with the protected instruction (e.g., shown as error_code in FIG. 7). Additionally, or alternatively, computing device 210 may identify information associated with the error that corresponds to an error information field associated with the error instruction (e.g., shown as error_info in FIG. 7). The information associated with the error may identify a line of code on which the exception is raised, a variable with which the error is associated, a time (e.g., a run time, a time of day, etc.) at which the exception is raised, the second condition, the first condition, a type of error, a function or protected zone in which the error is detected, etc. Computing device 210 may associate the error code with the information associated with the error.

As still further shown in FIG. 6, if an error handling instruction is not associated with a protected region (block 640—NO), then process 600 may include transferring control to a default error handler (block 645). For example, computing device 210 may determine whether an error handling instruction is associated with first region 710 (e.g., region 710-1 of FIG. 7) in which the line of code, associated with the error, is located. Based on a determination that the error handling instruction is not associated with the first protected region, computing device 210 may transfer control to a default error handler (e.g., default error handler 130) associated with first protected region 710. Additionally, or alternatively, computing device 210 may transfer all or a portion of the error result that includes the information, associated with the error and/or the error code, to the default error handler.

As further shown in FIG. 6, process 600 may include executing one or more lines of code in a next code region (block 650) or terminating execution of the code (block 655). For example, computing device 210 may use the default error handler to process the error in a manner similar to that described above with respect to block 620. The default error handler may store the transferred information in an entry, associated with a log file, that corresponds to the raised exception. The default error handler may also, or alternatively and as a result of processing the error, transfer control back to the code.

The default handler may, for example, perform a stack trace and may cause execution of the code to terminate based on the information associated with the error. When execution of the code is not terminated, the default handler may propagate the exception to a next code region, which may cause computing device 210 to execute a next line of code within second region 710 (e.g., region 710-2 of FIG. 7). Additionally, or alternatively, the default handler may cause computing device 210 to not execute a next line of code within first protected region 710 (e.g., shown as return 10 in FIG. 7). When no other code regions, associated with the code, are left to be executed, the default handler may terminate execute of code 700.

When the default handler transfers control back to the code and thus propagates the error, computing device 210 may execute a next line of code (e.g., shown as t:int=functionA(i) in FIG. 7), associated with a second protected instruction (e.g., function 705-2 of FIG. 7) within second region 710. Computing device 210 may also, or alternatively, determine that an error is associated with the executed line of code based on a determination that the error was associated with a first protected instruction in which the error was detected (e.g., shown as functionA(i) that corresponds to function 705-1 of FIG. 7) within first region 710. Computing device 210 may also, or alternatively, determine that the exception, associated with the first protected region 710, has propagated to second region 710.

Computing device 210 may also, or alternatively, generate an error result based on executing the line of code. The error result may, for example, inherit the programmer specified conditions, identified by the first protected instruction (e.g., function 705-1 of FIG. 7), based on the exception propagating to second region 710. Additionally, or alternatively, the error result may indicate that the error is not being used in the executed line of code when the error does not affect the execution of the line of code and/or does not include the variable (e.g., j) with which an error value is associated. For example, computing device 210 may determine that the error is associated with another variable (e.g., variable t), within second region 710. When generating the error result, computing device 210 may, for example, generate information associated with the error (e.g., a run time when the error is detected, a line of code in which the error is detected, a condition under which the error is detected, a variable with which the error is associated, a type of error, etc.). Computing device 210 may also, or alternatively, associated an error value with the variable with which the error is associated. Computing device 210 may also, or alternatively, associate the error value with the information associated with the error and may store the error value and/or the information associated with the error in a memory (e.g., in an error table) associated with computing device 210.

Computing device 210 may also, or alternatively, not raise an exception, associated with the error, based on a determination that a condition, under which the error is detected, does not satisfy a programmer specified condition inherited from the first region 710. Computing device 210 may, for example, determine that the exception does not escape from the second region 710 and thus, does not satisfy the second programmer specified condition (e.g., raise_on_escape). Additionally, or alternatively, computing device 210 may determine that the error is not being used by the executed line of code which does not satisfy the first programmer specified condition (e.g., raise_on_use). Based on the determination that the conditions under which the error is detected do not satisfy the programmer specified conditions inherited from first region 710, computing device 210 may not raise an exception, associated with the error.

Computing device 210 may, in a manner similar to that described above with respect to block 630, execute a next line of code (e.g., shown as y:int=3 in FIG. 7). Computing device 210 may execute the next line of code based on a determination that the next line of code is not associated with an error. Computing device 210 may also, or alternatively, execute a next line of code (e.g., shown as z=f(t) in FIG. 7) and may generate an error result based on a determination that a variable (e.g., t) is associated with a previously generated error value. Computing device 210 may, in this example, determine that the variable, associated with the error is being used within the next line of code. Based on the determination that the error has escaped the first protected region and/or that the error is being used within the next line of code, computing device 210 may determine that conditions, under which the error is detected, satisfy the programmer specified conditions inherited from first protected region 710. Computing device 210 may raise an exception, associated with the error, based on the determination that the programmer specified conditions are satisfied.

Computing device 210 may, in a manner similar to that described above with respect to block 640—NO, transfer control to a default error handler based on a determination that an error handling instruction is not associated with the second protected instruction and/or the second region 710.

The default error handler may process the error and may, as a result of processing the error, transfer control back to the code. For example, the default handler may, in a manner similar to that described above, perform a stack trace and may propagate the exception to a next code region, which may cause computing device 210 to execute a next line of code within third region 710 (e.g., region 710-3 of FIG. 7). Additionally, or alternatively, the default handler may cause computing device 210 to not execute a next line of code, within first protected region 710 (e.g., shown as return t in FIG. 7), and may terminate execution of the code (e.g., based on the information associated with the error). When no other code regions, associated with the code, are left to be executed, the default handler may terminate execute of code 700.

When the default handler transfers control back to the code and thus propagates the error, computing device 210 may, for example, execute a next line of code (e.g., shown as x=functionB(0) in FIG. 7), associated with a third protected instruction (e.g., function 705-3 of FIG. 7) within third region 710 (e.g., region 710-3 of FIG. 7).

Computing device 210 may detect the error in the next line of code based on a determination that the error was associated with the second protected instruction (e.g., shown as functionB(0) that corresponds to function 705-2 of FIG. 7). In this example, computing device 210 may, in a manner similar to that described above, determine that the error is associated with another variable within the second function (e.g., variable x) within third region 710 and may generate an error result (e.g., information associated with the error, an error value, etc.). In a manner similar to that described above computing device 210 may determine that the exception has propagated from second region 710 to third region 710, but that the error is not being used in the next line of code and/or has not escaped from second region 710. Based on the determination that the conditions under which the error is detected do not satisfy the programmer specified conditions inherited from first region 710 and/or second region 710, computing device 210 may not raise an exception, associated with the error.

When the exception is not raised, computing device 210 may also, or alternatively, execute a next line of code (e.g., shown as return x in FIG. 7) and may determine that the error is being used by the executed line of code when an error value is associated with the variable in the next line of code (e.g., variable x). Computing device 210 may also, or alternatively, generate an error result (e.g., information associated with the error, an error value, etc.) that indicates that the error has escaped from first region 710 and/or second region 710. Based on the determination that the error has escaped from first region 710 and/or second region 710, and/or that the error is being used by the executed line of code, computing device 210 may determine that the programmer specified conditions are satisfied. Computing device 210 may raise an exception, associated with the error, based on the determination that the programmer specified conditions are satisfied.

As yet further shown in FIG. 6, if an error handling instruction is associated with the protected region (block 640—YES), then process 600 may include executing the error handling instruction (block 660). Computing device 210 may, as a result of raising the exception, determine that an error handling instruction (e.g., error handling instruction 715 of FIG. 7) is associated with third region 710. Computing device 210 may execute one or more lines of code associated with the error handling instruction. For example, computing device 210 may associate an error code (e.g., corresponding to an error code field, "err_code" of error handling instruction 720) with the error based on a second condition (e.g., a use condition, an escape condition, etc.) associated with the error and/or a type of error (e.g., a syntax error, a divide by zero error, etc.). Computing device 210 may also, or alternatively, identify information associated with the error (e.g., corresponding to an error information field, "error_info" of error handling instruction 720), such as a line of code with which the exception is raised, the type of error, the second condition, a time (e.g., a runtime, a compile time, etc.) at which the error was detected, etc.

Additionally, or alternatively, computing device 210 may, by way of example, determine whether the error code matches a predetermined value (e.g., code1) specified by a programmer of computing device 210 (e.g., by executing a line of code, if (err_code=code 1), of FIG. 7). Based on a determination that the error code matches the predetermined value, computing device 210 may determine that the error is a known error and/or may execute a line of code (e.g., shown as return 0 in FIG. 7) that causes the third function to set the variable (e.g., x) equal to zero (e.g., as shown by x=functionC( ) of FIG. 7).

If, however, computing device 210 determines that the error code does not match the predetermined value, computing device 210 may determine that the error is an unknown error and/or may execute a line of code (e.g., shown as return 1 in FIG. 7) that causes the third function to set the variable (e.g., x) equal to one (e.g., as shown by x=functionC( ) of FIG. 7).

Additionally, or alternatively, computing device 210 may perform a variety of operations and/or acts based on programmer specified error handler instructions. For example, computing device 210 may provide a more reasonable value that is different than a value with which the error is associated. Additionally, or alternatively, computing device 210 may terminate execution of the code; may ignore the error; may generate a value that causes the code not to be terminated; may generate a report that includes information associated with the error; etc. Computing device 210 may execute other lines of code in a manner similar to that described above. Computing device 210 may stop analyzing the code when all of the lines of code and/or code regions 710 have been executed in the manner described above.

A system and/or method, described herein, may allow a computing device, associated with a DCS, to execute code and/or to process an error identified within the code. The computing device may determine whether to raise an exception associated with the identified error and/or to process the error using an error handler. The computing device may raise an exception, associated with an error, when the computing device determines that a condition, under which the error is detected, satisfies a programmer specified condition identified in a protected instruction. The computing device may not raise the exception when the condition, under which the error is detected, does not satisfy the programmer specified condition. When the exception is not raised, the computing device may retain control and may execute a next line of code.

When the exception is raised, the computing device may process the error using an error handler associated with the protected instruction. Additionally, or alternatively, the computing device may process the error based on an error handling instruction that includes programmer specified instructions that cause the error to be processed in a manner specified by the programmer.

Raising exceptions based on programmer specified conditions and/or processing errors based on programmer specified error handling instructions may permit the programmer to control a manner in which errors, within code, are identified and/or processed. The programmer specified conditions and/or error handling instructions may allow the programmer to control a manner in which different types of errors are identified and/or processed, manage a quantity of errors being handled over a period of time, and/or avoid an unplanned service disruption and/or shutdown of devices and/or networks on which the code is executing.

The foregoing description provides illustration and description, but is not intended to be exhaustive or to limit the implementations to the precise form disclosed. Modifications and variations are possible in light of the above implementations or may be acquired from practice of the implementations.

While series of blocks have been described with regard to FIGS. 5 and 6, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and/or methods is not limiting of the implementations. Thus, the operation and behavior of the systems and methods were described without reference to the specific software code—it being understood that software and control hardware can be designed to implement the systems and/or methods based on the description herein.

Further, certain portions, described above, may be implemented as a component or logic that performs one or more functions. A component or logic, as used herein, may include hardware, such as a processor, an ASIC, or a field-programmable gate array (FPGA), or a combination of hardware and software, such as a processor executing software.

It should be emphasized that the term "comprises/comprising," when used in this specification, is taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:
1. A method, comprising:
   obtaining, by a computing device, programming code;
   executing, by the computing device, a region of the programming code including a protected instruction that, when a particular error is detected, causes an exception associated with the particular error to be raised when a first condition is met;
   detecting, by the computing device, an error within a line of the programming code associated with the protected instruction;
   determining, by the computing device, that the first condition is met;

raising, by the computing device, an exception associated with the error in response to determining that the first condition is met; and processing, by the computing device, the error based on raising the exception associated with the error, processing the error including at least one of:
 remedying the error;
 ignoring the error;
 allowing the error to propagate to another region of the programming code; or
 storing information, associated with the error, in a memory associated with the computing device.

2. The method of claim 1, further comprising:
 precluding the exception from being raised when the first condition is not met by a given error; and
 executing a next line of the programming code based on precluding the exception from being raised.

3. The method of claim 2, further comprising:
 detecting that another error is associated with the next line of the programming code;
 raising another exception to the other error when another second condition, under which the other error is detected, meetings another first condition, the other first condition being different than the first condition; and
 processing the other error based on raising the other exception.

4. The method of claim 2, further comprising:
 detecting that another error is associated with the next line of the programming code;
 raising another exception to the other error when another second condition, under which the other error is detected, meets the first condition; and
 processing the other error based on raising the other exception.

5. The method of claim 1, wherein the protected instruction includes at least one of:
 a first field that includes information that identifies the first condition;
 a second field that includes an error code to be assigned based on a type of error detected by the computing device; or
 a third field that permits the computing device to store the information associated with the error, the information associated with the error identifying at least one of:
 a line of code in which the error is detected;
 a time at which the error is detected;
 the type of error detected;
 the second condition under which the error was detected;
 the protected instruction in which the error was detected; or
 the region in which the error was detected.

6. The method of claim 1, further comprising:
 executing one or more lines of the programming code associated with another region of the programming code;
 determining, based on executing the one or more lines of the programming code associated with the other region, whether the error is associated with the other region; and
 propagating the exception to the other region of the programming code when the error is associated with the other region.

7. The method of claim 6, further comprising:
 detecting another error within the one or more lines of the programming code associated with the other region;
 determining whether another second condition, under which the other error is detected, meets another first condition;
 raising another exception, associated with the other error, when the other second condition meets the other first condition; and
 processing the other error based on raising the other exception.

8. A computing device, comprising:
 a data storage device storing instructions executable by one or more processors; and
 one or more processors that interact with the data storage device and execute at least a portion of the stored instructions that cause the one or more processors to perform operations comprising:
 obtaining programming code;
 executing a region of the programming code including a protected instruction that, when a particular error is detected, causes an exception associated with the particular error to be raised when a first condition is met;
 detecting an error within a line of the programming code associated with the protected instruction;
 determining that the first condition is met;
 raising an exception associated with the error in response to determining that the first condition is met; and
 processing the error based on raising the exception associated with the error, processing the error including at least one of:
 remedying the error;
 ignoring the error;
 allowing the error to propagate to another region of the programming code; or
 storing information, associated with the error, in a memory associated with the computing device.

9. The computing device of claim 8, wherein execution of the instructions cause the one or more processors to perform operations further comprising:
 precluding the exception from being raised when the first condition is not met by a given error; and
 executing a next line of the programming code based on precluding the exception from being raised.

10. The system of claim 9, wherein execution of the instructions cause the one or more processors to perform operations further comprising:
 detecting that another error is associated with the next line of the programming code;
 raising another exception to the other error when another second condition, under which the other error is detected, meetings another first condition, the other first condition being different than the first condition; and
 processing the other error based on raising the other exception.

11. The system of claim 9, wherein execution of the instructions cause the one or more processors to perform operations further comprising:
 detecting that another error is associated with the next line of the programming code;
 raising another exception to the other error when another second condition, under which the other error is detected, meets the first condition; and
 processing the other error based on raising the other exception.

12. The system of claim 8, wherein the protected instruction includes at least one of:
 a first field that includes information that identifies the first condition;

a second field that includes an error code to be assigned based on a type of error detected by the computing device; or a third field that permits the computing device to store the information associated with the error, the information associated with the error identifying at least one of:
a line of code in which the error is detected;
a time at which the error is detected;
the type of error detected;
the second condition under which the error was detected;
the protected instruction in which the error was detected; or
the region in which the error was detected.

13. The system of claim 8, wherein execution of the instructions cause the one or more processors to perform operations further comprising:
executing one or more lines of the programming code associated with another region of the programming code;
determining, based on executing the one or more lines of the programming code associated with the other region, whether the error is associated with the other region; and
propagating the exception to the other region of the programming code when the error is associated with the other region.

14. The system of claim 13, wherein execution of the instructions cause the one or more processors to perform operations further comprising:
detecting another error within the one or more lines of the programming code associated with the other region;
determining whether another second condition, under which the other error is detected, meets another first condition;
raising another exception, associated with the other error, when the other second condition meets the other first condition; and
processing the other error based on raising the other exception.

15. A non-transitory computer-readable medium storing instructions that when executed by one or more processors of a computing device, cause the one or more processors to perform operations comprising:
obtaining programming code;
executing a region of the programming code including a protected instruction that, when a particular error is detected, causes an exception associated with the particular error to be raised when a first condition is met;
detecting an error within a line of the programming code associated with the protected instruction;
determining that the first condition is met;
raising an exception associated with the error in response to determining that the first condition is met; and
processing the error based on raising the exception associated with the error, processing the error including at least one of:
remedying the error;
ignoring the error;
allowing the error to propagate to another region of the programming code; or
storing information, associated with the error, in a memory associated with the computing device.

16. The non-transitory computer-readable medium of claim 15, wherein execution of the instructions cause the one or more processors to perform operations further comprising:
precluding the exception from being raised when the first condition is not met by a given error; and
executing a next line of the programming code based on precluding the exception from being raised.

17. The non-transitory computer-readable medium of claim 16, wherein execution of the instructions cause the one or more processors to perform operations further comprising:
detecting that another error is associated with the next line of the programming code;
raising another exception to the other error when another second condition, under which the other error is detected, meetings another first condition, the other first condition being different than the first condition; and
processing the other error based on raising the other exception.

18. The non-transitory computer-readable medium of claim 16, wherein execution of the instructions cause the one or more processors to perform operations further comprising:
detecting that another error is associated with the next line of the programming code;
raising another exception to the other error when another second condition, under which the other error is detected, meets the first condition; and
processing the other error based on raising the other exception.

19. The non-transitory computer-readable medium of claim 15, wherein the protected instruction includes at least one of:
a first field that includes information that identifies the first condition;
a second field that includes an error code to be assigned based on a type of error detected by the computing device; or
a third field that permits the computing device to store the information associated with the error, the information associated with the error identifying at least one of:
a line of code in which the error is detected;
a time at which the error is detected;
the type of error detected;
the second condition under which the error was detected;
the protected instruction in which the error was detected; or
the region in which the error was detected.

20. The non-transitory computer-readable medium of claim 15, wherein execution of the instructions cause the one or more processors to perform operations further comprising:
executing one or more lines of the programming code associated with another region of the programming code;
determining, based on executing the one or more lines of the programming code associated with the other region, whether the error is associated with the other region; and
propagating the exception to the other region of the programming code when the error is associated with the other region.

* * * * *